July 14, 1970     H. G. JACQUIN ET AL     3,520,479
FLUID OPERATED VALVE AND NOZZLE ARRANGEMENT
Filed Aug. 5, 1968
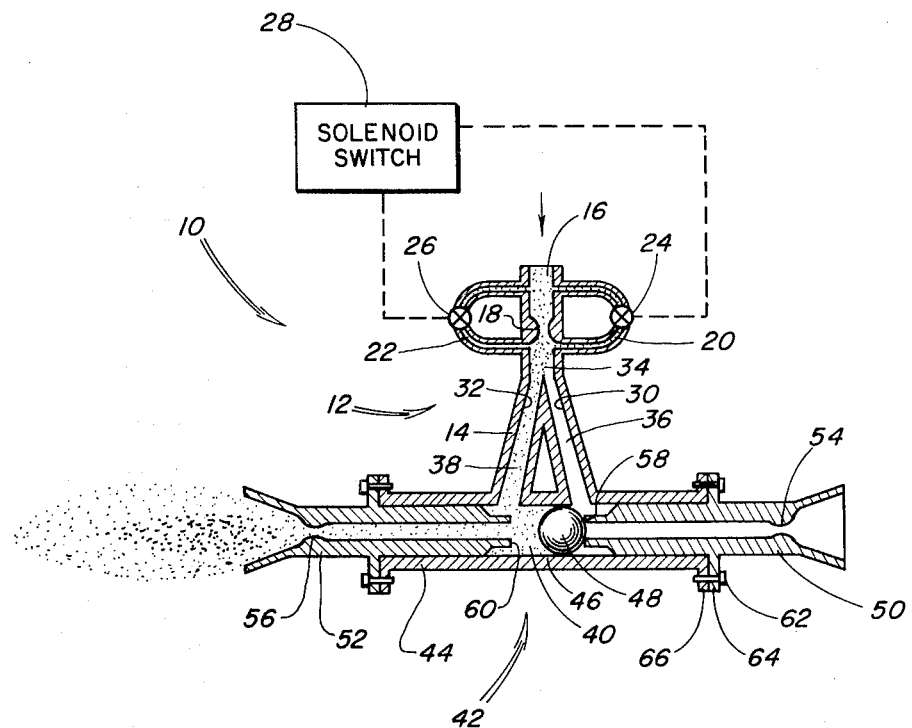
Humbert G. Jacquin
Paul A. Galvan
          INVENTORS
BY J. O. Tresansky
Jack C. Goldstein
          ATTORNEYS United States Patent Office 3,520,479
Patented July 14, 1970

3,520,479
FLUID OPERATED VALVE AND NOZZLE
ARRANGEMENT
Humbert G. Jacquin, Cupertino, and Paul A. Galvan,
San Jose, Calif., assignors, by mesne assignments, to
the United States of America as represented by the
Secretary of the Navy
Filed Aug. 5, 1968, Ser. No. 750,228
Int. Cl. B64c *15/14*
U.S. Cl. 239—265.23                                    6 Claims

ABSTRACT OF THE DISCLOSURE

A fluid operated valve and nozzle arrangement including a Coanda Effect fluid amplifier having its outlet passages fluidly connected to a plenum chamber in which a spherical shuttle valve is positioned between said outlet passages so as to be sealed against one or the other of a pair of thrust nozzles, depending upon which of the outlet passages is receiving fluid.

BACKGROUND OF THE INVENTION

This invention generally relates to fluid operated valve and nozzle arrangements and, more particularly, to a hybrid, pure fluid amplifier-type, control valve and nozzle arrangement particularly suitable for roll and attitude control and guidance of rocket propelled vehicles, such as space vehicles and missile systems including satellite interceptors, anti-missile systems, and spaceship rendezvous vehicles.

Rocket propelled vehicles, such as space vehicles and missiles are normally steered by varying the direction of the thrust vector about the center of gravity of the vehicle. Various devices have been employed for this purpose heretofore, such as swivel nozzles, gimballed motors, jet vanes or tabs, jetavators, and secondary injection systems; however, each of these devices has important disadvantages.

The guidance moments necessary for controlling and stabilizing rocket propelled vehicles are frequently created by deflection of the jet of the propulsion unit. In many of the present day rockets, the nozzles of the propulsion unit are movable, and a deflection of the jet of the propulsion unit is effected by the inclination of the nozzles. This approach poses serious technical problems. In fact, it is necessary to compromise certain parameters in order to reduce the friction of the movable nozzle, while at the same time ensuring perfect sealing at very high temperatures. Under these circumstances the energy necessary for the inclination of the nozzles must be taken from an auxiliary power source.

The gimballing motor approach has been found to be impractical for most of the solid propellant and large liquid propellant rockets because of the heavy masses which must be positioned quickly, as well as the added power necessary to accomplish this.

In order to avoid these difficulties, another approach in the course of development contemplates the deflection of the jet by the interposition of "obstacles" at the position of the exit section of fixed nozzles. These "obstacles" can be solid baffles in the form of jet vanes or tabs, as well as jetavators. However, each of these arrangements requires considerable operating power and is severely limited by the higher exhaust gas temperatures incurred in the larger rockets now being produced.

Still another technique of thrust deflection under consideration is the injection of a gas or liquid stream into the path of the rocket exhaust gas stream. The injection of such a stream into the divergent section of an exhaust nozzle creates a compression wave which acts to deflect the flow of the main exhaust stream and/or provides asymmetric regulation in chambers disposed beyond the outlet of a convergent-divergent nozzle. In the latter system, it is necessary to create, in the two opposite chambers, an over-pressure and a depression in relation to the exit pressure, the value of which is a function of the generating pressure and the nozzle geometry. Such systems have proved to be difficult to calibrate since the exit and generating pressures may vary over a wide range. Furthermore, since the injection nozzle is disposed substantially externally of the propulsion system, the injection nozzle is subject to damage during handling prior to utilization and also to fouling.

It has also been proposed to employ a pure fluid amplifier, aerodynamic valve to selectively direct the flow of a hot fluid from a junction toward one or the other of a pair of auxiliary rocket nozzles. An example of this type of arrangement is illustrated in U.S. Pat. 3,285,262 particularly FIG. 2 thereof. Although systems of the type described have generally served their purpose, they have not proved entirely satisfactory under all conditions of service, particularly in a hard vacuum ambient environment, such, for example, as outer space, wherein considerable difficulty is experienced in compensating for leakage through the "off" nozzle and the resultant loss in efficiency and wherein there are, at times, complete operational failures. Nevertheless, such auxiliary rocket systems do provide a degree of structural simplicity somewhat foreign to the various systems of deflecting the main thrust jet stream. The use of a pure fluid amplifier in such an auxiliary rocket system provides substantial weight reduction over an auxiliary nozzle system controlled by purely mechanical valves, but the problem of jet stream leakage in a hard vacuum ambient environment persists.

SUMMARY OF THE INVENTION

Accordingly, one object of this invention is to provide a new and improved roll and attitude control system for impulse propelled vehicles.

Another object of the invention is the provision of a new and improved fluid operated valve and nozzle arrangement characterized by lightness of weight and simplicity of construction.

Still another object of the present invention is to provide a new and improved fluid operated valve and nozzle arrangement having relatively few moving parts and a hard vacuum ambient environment capability.

A further object of the instant invention is to provide a new and improved pure-fluid amplifier type valve and nozzle arrangement having a near perfect practical efficiency in a hard vacuum ambient environment.

A still further object of this invention is the provision of a new and improved fluid operated valve and nozzle arrangement having a fast response time.

Still another further object of the instant invention is to provide a new and improved fluid operated valve and nozzle arrangement requiring little or no additional power from operation thereof and not requiring an auxiliary power source.

Briefly, in accordance with one embodiment of this invention, these and other objects are attained by providing a boundary layer or Coanda Effect fluid amplifier having outlets in fluid communication with open-ended plenum chamber at two longitudinally spaced points thereon, a tube extending into each end of the plenum chamber having a thrust nozzle at the outer extremity and an annular valve seat at the inner extremity, and a shuttle check valve slidably positioned within said plenum chamber between said two spaced points.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawing wherein the only figure is a plan view, partly in section, of a preferred embodiment of the fluid operated valve and nozzle arrangement according to the present invention.

DESCRIPTION OF THE PREFERRED EMBODIMENT

Referring now to the drawing, the fluid operated valve and nozzle arrangement of the present invention, indicated generally by the reference numeral 10, is shown as including a conventional boundary layer or Coanda Effect fluid amplifier 12 in which a power jet may be deflected by the action of the side walls of an interaction chamber which are shaped in such a way that the power jet will attach to one or the other of the side walls, but not to both side walls. This operation is brought about by the entrainment action of the power jet wherein the power jet tends to entrain air trapped between it and an adjacent side wall, the entrainment becoming more effective as the power jet approaches the adjacent side walls. This type of fluid device is basically a two position device and, for this reason, is often referred to as a digital device.

Fluid amplifier 12 is provided with a housing or body 14, preferably in the form of a plate of any material suitable for the operating conditions, such as metal, plastic or the like, which is slotted in the conventional but unique configuration to provide a boundary layer of Coanda Effect fluid amplifier. Body 14 is formed with a main pressure fluid receiving or inlet opening 16 having a restricted neck portion 18 defining a nozzle from which the received fluid issues as a jet.

In order to control the direction of flow of the jet, body 14 is formed with a pair of control passages 20 and 22 each opening at areas on each side of but adjacent nozzle 18, on opposite sides of the axis of the nozzle. Control passages 20 and 22 are shown as adapted to receive fluid pressure from the main fluid inlet stream and are controlled by a pair of pilot valves 24 and 26 disposed therein actuated by any suitable means, such a conventional solenoid switch 28, for maintaining one of the pivot valves opened to fluid flow and the other closed thereto.

It should be understood, however, that control passages 20 and 22 may be adapted to receive fluid pressure from any suitable source in order to cooperate with the boundary layer regions adjacent side walls 30 and 32 of an interaction chamber 34 located downstream of nozzle 18 to control deflection of the jet issuing from nozzle 18.

As is understood in the art, the fluid jet issuing from the nozzle 18 normally attaches to one or the other of the side walls 30 and 32 in the absence of fluid flow through control passages 20 and 22, and will enter one of two fluid receiving passages 36 and 38 formed in body 14 in fluid communication with a plenum chamber 40 of a valve and nozzle section 42. Let it be assumed that the fluid jet generated by nozzle 18 initially attaches to the side wall 30. If fluid flow is introduced into interaction chamber 34 through control passage 20, as illustrated, then the jet will be detached from side wall 30 and will be flipped into attachment with side wall 32, as illustrated, with the jet remaining in the attached condition even if the fluid flow through control passage 20 is terminated. To detach the jet from wall 32, fluid flow must be introduced to interaction chamber 34 through control passage 22, at which point the jet will detach from wall 32 and flip into attachment with wall 30. The above described attaching and detaching actions of the jet occur very rapidly in response to very small fluid flow in control passages 20 and 22.

In the illustrated embodiment, valve and nozzle section 42 is in the form of a tubular portion 44 of body 14 providing a valve cylinder 46 which contains a spherically shaped shuttle check valve 48 having a diameter substantially equal to tubular portion 44. Valve 48 is reciprocably movable in cylinder 46 between a pair of combination valve seat and nozzle tubes 50 and 52 having converging-diverging thrust nozzles 54 and 56 in the outer extremities thereof, respectively, and providing annular valve seats 58 and 60 respectively in the inner extremities thereof. It should be apparent that valve 48 will be displaced against either one of valve seats and 58 and 60, depending upon which of the passages 36 and 38 is receiving fluid. In this manner, valve 48 provides a positive fluid seal of the particular combination valve seat and nozzle tube not being utilized, thereby ensuring against leakage through the "off" nozzle which might otherwise exist in a hard vacuum ambient environment if plenum chamber 40 were merely partitioned by a stationary passage block or if passages 36 and 40 were directly connected to a pair of thrust nozzles with no sealing valve. Moreover, since the spherical valve is of the same diameter as the plenum chamber, the valve also seals the off outlet passage.

The valve seat and nozzle tubes 50 and 52 may be sealingly secured to body 14 in any conventional manner, such as by a plurality of bolts 62 passing through a smooth bore in an external annular flange 64 on tube 50 and threadedly secured to an internally threaded bore in an external annular flange 66 on body 14.

As previously stated, fluid under pressure is applied to opening 16 and to control passages 20 and 22 of fluid amplifier 12, and the pressure of the fluid applied to the control passages is employed to control the direction of the deflection of the fluid jet issuing from nozzle 18 by means of pilot valves 24 and 26 selectively controlled by solenoid switch 28. In this manner, no additional power source and minimal extra power are required to effect the switching. Fluid applied to opening 16 and to passages 20 and 22 may be supplied from any suitable source of pressure fluid, and in the present invention the control device is self-energized wherein the fluid applied to opening 16 and to passages 20 and 22 is derived from the same source. The direction of the deflection of the fluid jet issuing from nozzle 18 controls the position of reciprocable valve 48 against one of the valve seats 58 and 60 thereby ensuring against the leakage of fluid through the "off" nozzle, even in a hard vacuum. In such a manner the valve and nozzle arrangement of the present invention may be effectively utilized for guidance in an impulse propelled vehicle (not shown).

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A fluid operated valve and nozzle arrangement comprising:
    a fluid amplifier having
        a fluid inlet,
        an interaction chamber,
        means fluidly connecting said inlet opening and said interaction chamber for generating a jet of fluid for injection into said interaction chamber,
        a pair of fluid receiving passages fluidly connected at one end thereof to said interaction chamber and providing a pair of outlet openings at the other ends thereof, and
        control means for selectively deflecting the generated jet of fluid from said nozzle to either one of said pair of fluid receiving passages;
    means providing an elongate, open-ended plenum chamber in fluid communication with each of said fluid amplifier outlet openings at first and second spaced points therein;
    a pair of tubular members, each one of which extends into an end of said plenum chamber and is sealingly secured thereto, having
        a first extremity providing a valve seat within said plenum chamber near said fluid amplifier outlet openings and a second extremity providing a thrust nozzle; and a shuttle valve slideably positioned within said plenum chamber between said first and second spaced points.

2. The arrangement of claim 1 wherein said fluid amplifier control means includes a pair of control passages, each fluidly connected between said inlet opening and said interaction chamber but on opposite sides of the axis of said nozzle with respect to each other; and a pair of pilot valves, one in each of said control passages to selectively control the flow in said passage.

3. The arrangement of claim 2 wherein said fluid amplifier control means further includes means for selectively ensuring that one of said pilot valves is opened and the other of said pilot valves is closed.

4. The arrangement of claim 3 wherein said means for selectively ensuring the position of said pilot valves includes a solenoid switch.

5. A fluid operated valve and nozzle arrangement comprising:

a plenum chamber having first and second fluid inlets and first and second fluid outlets, valve means within said plenum chamber including a first valve seat positioned between said first inlet and said first outlet, a second valve seat positioned between said second inlet and said second outlet, and a fluid operated shuttle valve movable between said first and second valve seats to selectively close either one of said valve seats; and a bistable fluid amplifier having first and second fluid outlet passages sealingly coupled respectively to said first and second inlets of said plenum chamber.

6. The arrangement of claim 5 wherein each of said first and second fluid outlets of said plenum chamber has a thrust nozzle formed therein.

References Cited

UNITED STATES PATENTS

| | | | |
|---|---|---|---|
| 3,122,062 | 2/1964 | Spivak et al. | 137—81.5 XR |
| 3,135,291 | 6/1964 | Kepler et al. | 137—81.5 |
| 3,143,856 | 8/1964 | Hausmann | 137—81.5 XR |
| 3,168,898 | 2/1965 | Samet | 137—81.5 XR |
| 3,182,686 | 5/1965 | Zilberfarb | 137—81.5 XR |
| 3,229,460 | 1/1966 | Jones | 239—265.23 |
| 3,279,185 | 10/1966 | Lewis et al. | 239—265.23 |
| 3,285,262 | 11/1966 | Ernst et al. | 137—81.5 |

M. HENSON WOOD, Jr., Primary Examiner

E. A. CHURCH, Assistant Examiner

U.S. Cl. X.R.

137—81.5; 239—265.29